Nov. 9, 1948.     H. M. SHERIDAN     2,453,464
TOOL HOLDER
Filed May 31, 1945
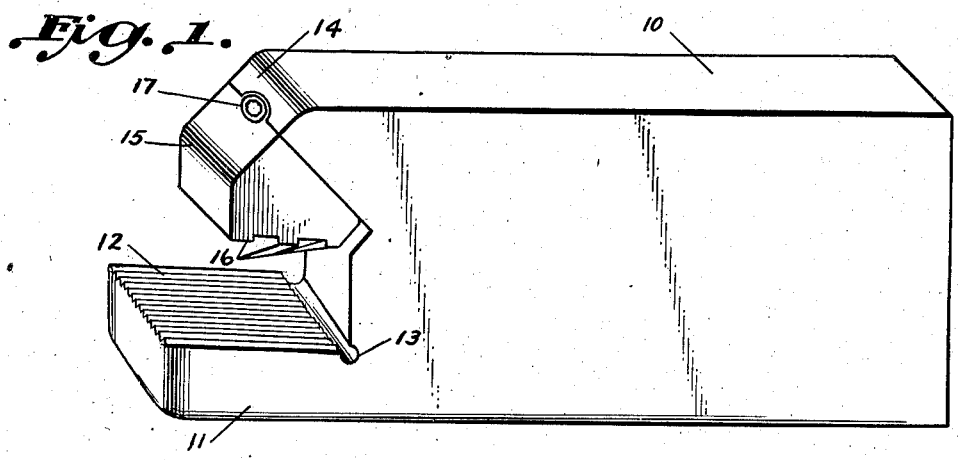
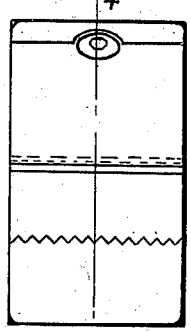
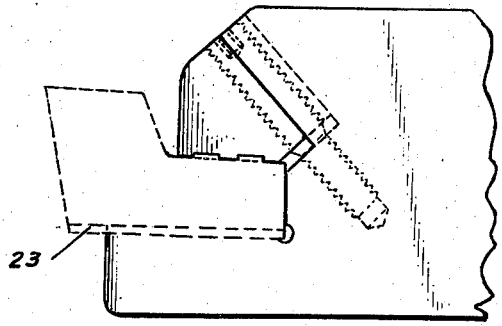
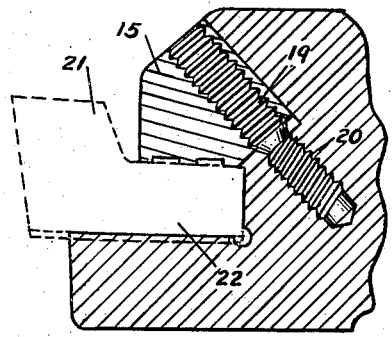
INVENTOR.
BY Henry M Sheridan
A. T. Sperry Patented Nov. 9, 1948

2,453,464

UNITED STATES PATENT OFFICE 2,453,464

TOOLHOLDER

Henry M. Sheridan, Erie, Pa., assignor to Apex Tool & Cutter Company, Shelton, Conn., a corporation of Connecticut Application May 31, 1945, Serial No. 596,820

1 Claim. (Cl. 29—96)

This invention relates to tool holders and particularly to tool holders of the replaceable bit type in which a removable cutting tool or bit may be removably and adjustably secured within the holder which in turn is carried by the tool feed mechanism of a machine tool.

It is among the general objects of the invention to provide a bit holder of simple and improved design which will securely retain a tool bit with such rigidity as to preclude inadvertent displacement thereof and so as to lock the same in the holder as an integral part thereof thus preventing chattering or other vibrations which would impart characteristic imperfections to the surface of the work.

Another object of the invention is to provide an improved tool holder which will reduce to a minimum any extending or overhanging parts thus to provide for the application of the tool to the work at various angles and to permit the holder to closely approach the work without having to be spaced therefrom because of extending parts and securing devices.

A further object of the invention is to provide an improved bit holder which has a top securing member which may be adjusted to cause a downward and inward pressure of the bit shank so as to securely lock the same within the holder and so as to present a readily accessible means for adjusting the securement.

A further object of the invention is to provide a tool holder with improved bit locking means including longitudinally extending serrations together with transversely extending pressure ribs so as to provide for right angularly disposed securing areas which will preclude transverse or longitudinal displacement of the bit.

Other objects and features of the invention will be apparent from the consideration of the present specification taken in connection with the accompanying drawings in which:

Fig. 1 is a perspective view of one form of the present invention;

Fig. 2 is an end elevation of that form of the invention shown in Fig. 1;

Fig. 3 is a detailed side elevation of the head of the present improved tool holder, and Fig. 4 is a detailed sectional view taken on the lines 4—4 of Fig. 2.

The tool holder of the present invention may be generally characterized as comprising a holder body or shank which is adapted to be secured in the head of the machine tool. The forward end of the holder is provided with a bit receiving seat which is preferably inclined slightly upwardly from the axis of the body and which is also preferably provided with longitudinally extending serrations over the table. The body is provided with a sloping surface upon which is seated a bit clamping wedge having a lower surface provided with transversely extending pressure ribs and which is adjustably movable on its surface by a securing member in such manner that adjustment thereof will tend to draw a bit inwardly as well as downwardly towards the seat.

Referring more particularly to the drawings the inventive concept is here disclosed as embodying a holder having an elongated longitudinal body 10 which is adapted to be securely clamped on the tool head of the machine tool. The forward end of the body 10 has a forwardly projecting bit seat 11, the lower and side surfaces of the table being coextensive with the lower end side walls of the body 10. The upper surface of the seat is preferably inclined upwardly from the transversely axial plane of the body 10, the surface preferably forming a 5° angle with respect to such plane. The surface of the seat 11 is also preferably provided with longitudinally extending serrations 12 which are adapted to cooperate with the serrations 23 of the tool bit as indicated in Fig. 4 so as to preclude accidental transverse movement of the bit with respect to the holder. The inner edge of the seat joins a vertical terminal wall of the holder preferably through a joining radius 13, the radius providing for the firm seatment of the inner wall of the bit against the terminal wall of the body and precluding the possibility of chips or other foreign matter interfering with such seatment. The upper portion of the terminal end of the body is provided with an overhanging lip 14 having a lower inclined surface disposed approximately at 45° with respect to the surface of the seat. Upon this inclined surface is mounted a securing wedge 15, the lower surface of which lies parallel with the surface of the bit seat and is provided with transversely extending pressure ribs 16 which are adapted to engage and apply spaced pressure to the upper surface of the bit shank (see Fig. 4). The wedge 15 is adapted to be adjustably moved over the surface of the lip 14 by a bolt 17, the threads 19 of which engage the wedge 15 while the inner threads 20, which are reversely threaded with respect to the threads 19, engage the body 10. It will be noted that the pitch of the threads 19 is less than the pitch of the threads 20 thus upon turning the bolt in clockwise direction it will longitudinally move into the body while the wedge will also move inwardly and downwardly but to a less extent and thus a leverage is obtained to provide a sure locking of the bit shank between the ribs 16 and the seat. By referring to Fig. 4, it will be noted that the tool bit 21 has a cutting portion forming an integral part with the shank and that in position the bit may be applied to a work surface without the necessity of overcoming the obstructions of overhanging parts and extending locking mechanisms. With regard to the serrations and the pressure bars, it will be understood that the invention is not limited to either or both of such elements and that an interchange of serrations and bars between the seat and wedge may be resorted to if desired.

Thus it will be seen that the full use of equivalents may be resorted to without departure of the spirit or scope of the invention. It will also be understood that numerous changes and modifications will not constitute a departure from the spirit or scope of the invention as outlined in the appended claim.

What I claim is:

In a tool bit holder, a straight solid shank, a bit seat constituting a straight axial extension of said shank having a bit receiving surface substantially parallel with the axis of said shank, a vertical terminal wall of said shank constituting an inner terminal wall for said bit receiving surface, an inclined guide surface formed on said shank outwardly of said terminal wall and overlying said bit receiving surface and disposed with respect thereto at an angle of substantially 45°, a wedge adjustably mounted on said guide surface having a bit surface disposed towards said bit receiving surface and in a plane substantially parallel therewith to form in combination with said bit receiving surface and said terminal wall a bit shank receiving pocket bounded by three right angularly disposed surfaces, a plurality of transversely disposed spaced flat faced pressure ribs formed on said wedge bit surface having their flat faces in a single plane to engage a flat bit surface at spaced parallel areas, and adjusting means comprising an adjusting screw having separate reversely threaded sections, one of said sections threadedly engaging said wedge while the other section threadedly engages the shank, said screw being operable from the bit end of said shank to move said wedge towards and from said bit receiving surface to apply vertical pressure by said pressure ribs against a bit shank seated thereon.

HENRY M. SHERIDAN.

REFERENCES CITED

The following references are of record in the file of this patent:

UNITED STATES PATENTS

| Number | Name | Date |
| --- | --- | --- |
| 1,420,171 | Wille | June 20, 1922 |
| 2,150,561 | Reaney | Mar. 14, 1939 |
| 2,255,737 | Severson | Sept. 9, 1941 |